United States Patent [19]
Kim

[11] Patent Number: 5,301,131
[45] Date of Patent: Apr. 5, 1994

[54] APPARATUS AND METHOD FOR CONTROLLING THE ROTATIONAL SPEED OF A MOTOR

[75] Inventor: Chang-Gyun Kim, Seoul, Rep. of Korea

[73] Assignee: Daewoo Electronics Co., Ltd., Seoul, Rep. of Korea

[21] Appl. No.: 975,476

[22] Filed: Nov. 12, 1992

[30] Foreign Application Priority Data

Nov. 11, 1991 [KR] Rep. of Korea .................. 91-19985

[51] Int. Cl.$^5$ ..................... G01P 1/04; G05B 11/06; G05B 13/00
[52] U.S. Cl. .................................. 364/565; 364/176; 364/183; 318/632
[58] Field of Search ............... 364/565, 494, 176, 183, 364/174; 324/160, 161; 318/66, 68, 69, 632

[56] References Cited

U.S. PATENT DOCUMENTS

| | | | |
|---|---|---|---|
| 4,216,419 | 8/1980 | Van Dam et al. | 318/327 |
| 4,506,312 | 3/1985 | Chan et al. | 364/565 X |
| 4,648,104 | 3/1987 | Yachida et al. | 364/565 X |
| 4,878,165 | 10/1989 | Gotou et al. | 364/158 |
| 4,953,076 | 8/1990 | Yamamoto | 364/183 X |
| 4,980,617 | 12/1990 | Tajima et al. | 318/632 X |

FOREIGN PATENT DOCUMENTS 2166891A 5/1986 United Kingdom .

*Primary Examiner*—Kevin J. Teska
*Assistant Examiner*—Eric W. Stamber
*Attorney, Agent, or Firm*—James D. Hall; Thomas J. Dodd

[57] ABSTRACT

An apparatus for controlling the rotational speed of a motor. The apparatus comprises a subtracter for subtrating a speed error signal corresponding to a frequency signal generated from a frequency generator from a period deviation signal between the frequency signal and a predetermined reference frequency signal to produce a primarily compensated speed error signal; a first adder for adding the primarily compensated signal and the period deviation signal to produce an added signal; a delay circuit for delaying the output signal of the first adder, wherein the delay circuit comprises a first to an Nth delay cells, wherein each of the delay cells latches the output signal of the first adder entering the first delay cell and serially shifts the latched signal in each of the delay cells toward the Nth delay cell by one signal at a time whenever the output of the first adder is supplied to the delay circuit and wherein the output of the delay circuit is supplied to the subtracter and to the first adder; a summation circuit for summing up all of the signals being shifted from the respective delay cells to produce a sum period deviation signal; an averaging circuit for averaging the sum period deviation signal to produce an averaged deviation signal; and second adder for adding the primarily compensated signal and the averaged deviation signal to produce the motor speed control signal with a compensated period deviation. A method is also provided for controlling the speed of the motor.

9 Claims, 6 Drawing Sheets

APPARATUS AND METHOD FOR CONTROLLING THE ROTATIONAL SPEED OF A MOTOR

FIELD OF THE INVENTION

The present invention relates to a digital servo system and, more particularly, to an apparatus and a method for controlling the rotational speed of motors such as a drum and a capstan motors used in a video cassette recorder (hereinafter referred to as a VCR), through the use of an improved repetitive learning control system.

BACKGROUND OF THE INVENTION

In general, a VCR is provided with a drum motor to rotate the rotary head drum, a capstan motor to transfer a video tape and a servo circuit for controlling the rotational speed of these motors.

In a typical prior art servo system such as the one illustrated in FIG. 1, a frequency generator 4 is adapted to periodically generate a frequency signal FG corresponding to the rotational speed of the motor 2 each time the motor is rotated by a predetermined angle (for example, 30°). The frequency signal from the frequency generator 4 is supplied to a circuit 12 for detecting the speed error of the motor 2 by comparing the frequency signal with a predetermined reference frequency or speed signal to produce a speed error signal. The speed error signal is provided to a PID (Proportional Integration Differential) controller 16 and then to an amplifier 18 for driving the motor. The output of the amplifier 18 is used as a speed control signal and the speed of the motor is thereby controlled.

However, since most frequency generators have certain degrees of manufacturing tolerance, a deviation between the reference signal and the periodic frequency signals generated by the frequency generator may cause the production of a speed error signal in spite of a constant rotational speed of the motor. Consequently, it is rather difficult to precisely control the rotational speed of a motor.

In recent years, a repetitive learning servo system for controlling the rotational speed of the motor has been proposed. One of such systems is described in an article by Makoto Gotou, et. al., entitled *Development of Multirate Sampling Repetitive Learning Servo System and its Application to a Compact Camcorder*, IEEE/RSJ International Workshop on Intelligent Robots and Systems IROS '91, Nov. 3–5, 1991, Osaka, Japan, IEEE Cat. No. 91TH0375-6.

This repetitive learning servo system compensates repetitively the period deviation of the periodic frequency signals to make it zero after the lapse of a certain period. The compensated signal may be used as a speed control signal comparable to the speed control signal which is employed in the typical system shown in FIG. 1.

However, control through the use of the repetitive learning servo system may entail a worse result than that of the traditional servo system in certain situations. For instance, in the event that the rotational speed of the motor is changed by certain external factors so that it is constantly maintained for a long time at the state of the changed speed, the repetitive learning servo system will fail to correctly control the rotational speed of the motor because the average period deviations would become zero at the changed speed.

SUMMARY OF THE INVENTION

Therefore, it is an object of the present invention to provide an improved repetitive learning servo system capable of correctly compensating the period deviations of a motor.

It is another object of the present invention to provide an apparatus and a method for controlling the rotational speed of the motor through the use of the improved repetitive learning servo system.

According to one aspect of the present invention, there is provided an apparatus for periodically detecting a speed error signal in response to a frequency signal periodically generated from a frequency generator in response to the rotation of a motor by a predetermined angle and repetitively compensating a period deviation between the frequency signal and a predetermined reference frequency signal to produce a motor speed control signal, the apparatus comprising: a means for subtracting the speed error signal supplied to a first input terminal thereof from a period deviation signal supplied to a second input terminal thereof to produce a primarily compensated speed error signal; a first means for adding the primarily compensated signal supplied to the first input terminal thereof and the period deviation signal supplied to the second input terminal thereof to produce an added signal; a means for delaying the output signal of the first adding means, wherein the delaying means comprises a first to an Nth delay cells, wherein each of the delay cells latches the output signal of the first adding means entering the first delay cell and serially shifts the latched signal in each of the delay cells toward the Nth delay cell by one signal at a time whenever the output of the first adding means is supplied to the delaying means and wherein the output of the delaying means is supplied to the second input terminal of the subtracter means and to the second input terminal of the first adding means; a means for summing up all of the signals being shifted from the respective delay cells to produce a sum period deviation signal; a means in response to the summing means for averaging the sum period deviation signal to produce an averaged deviation signal; and a second means for adding the primarily compensated signal of the subtracter means and the averaged deviation signal of the averaging means to produce the motor speed control signal with a compensated period deviation.

In another aspect of the present invention, a method is provided for periodically detecting a speed error signal in response to a frequency signal periodically generated by a frequency generator in response to the rotation of a motor by a predetermined angle and repetitively compensating a period deviation between the frequency signal and a predetermined reference frequency signal to produce a motor speed control signal, the method comprising the steps of: (a) subtracting the speed error signal from a period deviation signal to produce a primarily compensated speed error signal; (b) adding the primarily compensated speed error signal and the period deviation signal to produce an added signal; (c) delaying the added signal during one rotation cycle of the motor to produce the period deviation signal whenever the added signal is produced; (d) summing up all of the added signal produced during the one rotation cycle of the motor to produce a sum period deviation signal; (e) averaging the sum period deviation signal to produce an averaged signal; and (f) adding the primarily compensated speed error signal and the averaged signal to produce the motor speed control signal.

BRIEF DESCRIPTION OF THE DRAWINGS

A preferred embodiment of the invention will now be described with reference to the accompanying drawings, wherein like numerals refer to like parts in different views.

DETAILED DESCRIPTION OF THE INVENTION

Figure 1:
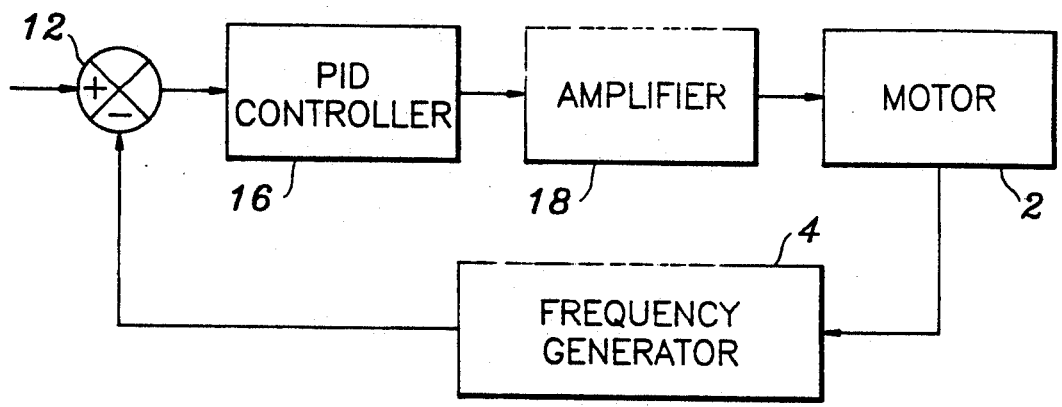
FIG. 1 shows a schematic block diagram of a typical servo system.
Figure 2:
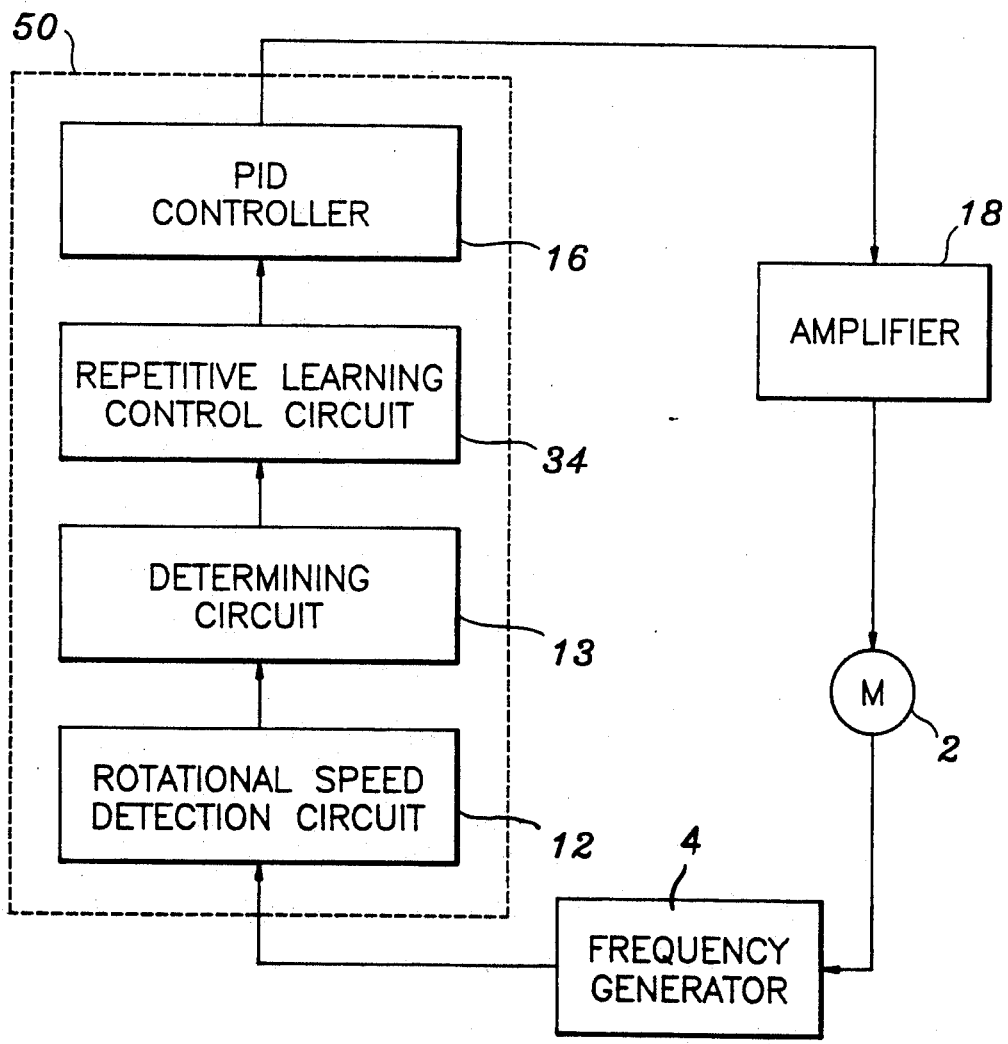
FIG. 2 shows a block diagram of a servo system for controlling the rotational speed of a motor in accordance with the present invention.

Referring now to FIG. 2, there is shown a block diagram of servo system for controlling the rotational speed of a motor. The system comprises a motor 2, a frequency generator 4, a digital servo circuit 50 and an amplifier 18.

Figure 3:
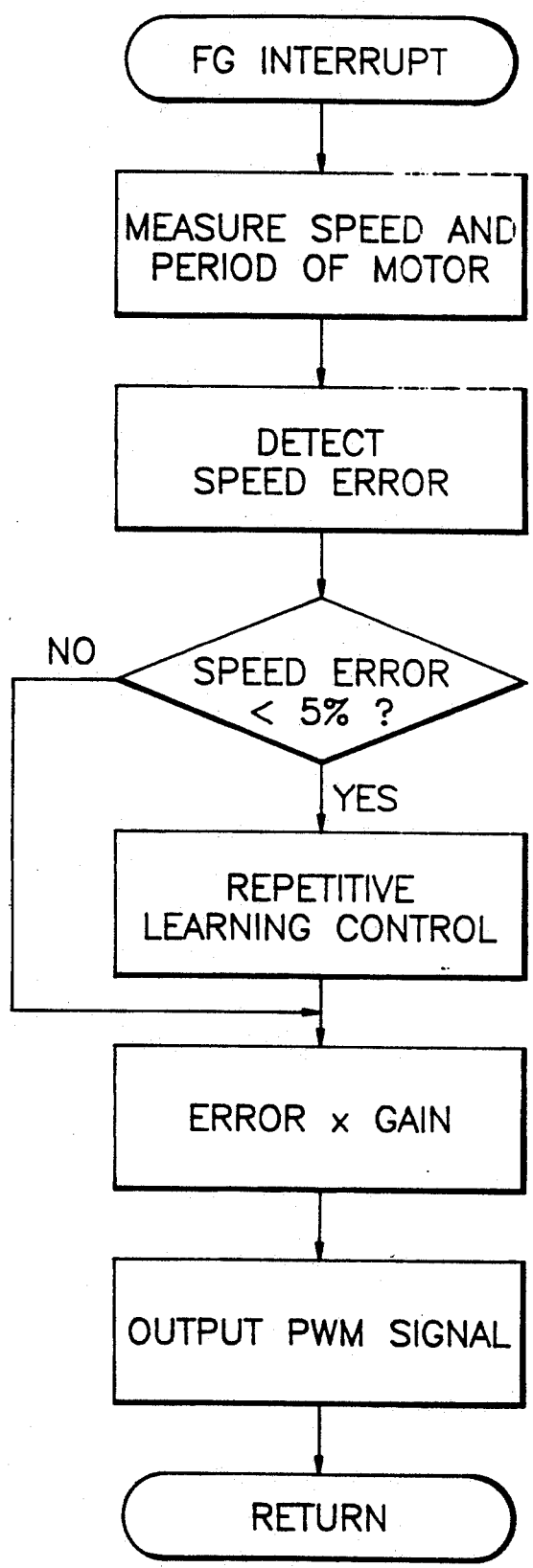
FIG. 3 is a flowchart showing an outline of FG interrupt processing according to the present invention.

The digital servo circuit 50 accomplishes an FG interrupt routine as shown in FIG. 3 whenever a frequency signal is generated by the frequency generator 4 in response to the rotation of the motor 2 by a predetermined angle, which may be implemented with, e.g., one-chip microcomputer ($\mu$-PD78134) available from NEC.

The servo circuit 50 comprises a rotational speed detection circuit 12, a determining circuit 13, a repetitive learning control circuit 34, and a PID controller 16, all of which may be implemented with the software in the microcomputer 50 or with separate hardware circuits.

The speed detection circuit 12 detects the rotational speed of the motor 4 on the basis of the frequency signal and produces a speed error signal. The speed error signal is provided to the determining circuit 13 prior to being supplied to the repetitive learning circuit 34 in accordance with the present invention. The determining circuit 13 determines whether or not the fluctuation range of the speed error signal from a predetermined reference speed (or frequency) signal is within a predetermined range. More specifically, when the motor begins to rotate in response to an operation signal, a large amount of speed fluctuation may occur until the motor reaches its stable state. Also, for the VCRs, the speed fluctuation may result from a change in the operation mode in addition to the disturbance such as the movement or vibration during the operation. If the fluctuation range is above the predetermined range, for example, 5%, the speed error signal will be directly supplied to the PID controller 16. On the other hand, if the fluctuation range is within the predetermined range, the speed error signal will be selectively processed in the repetitive learning circuit 34 prior to being provided to the PID controller 16.

Figure 4:
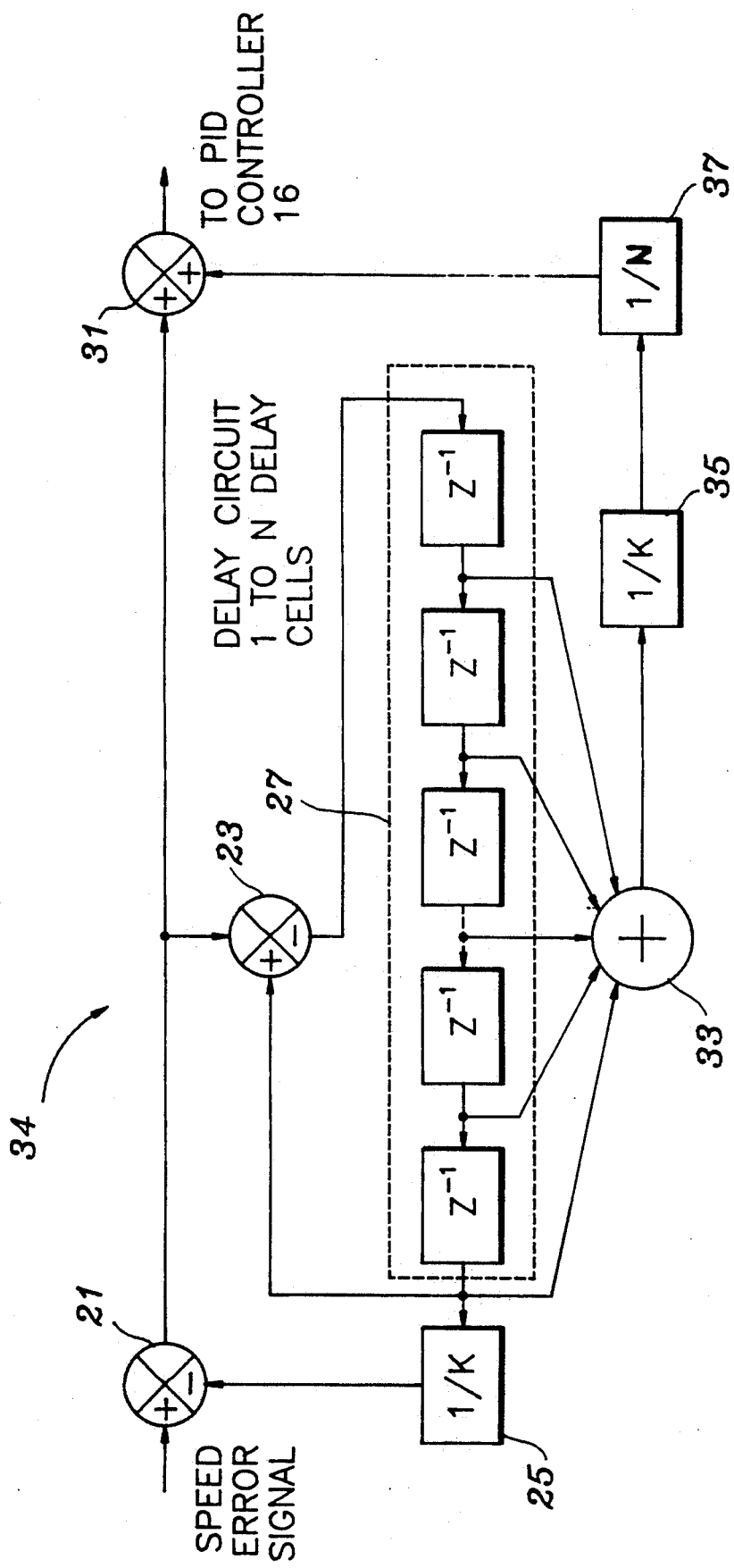
FIG. 4 shows a block diagram of a repetitive learning circuit incorporated in the servo system.
Figure 5:
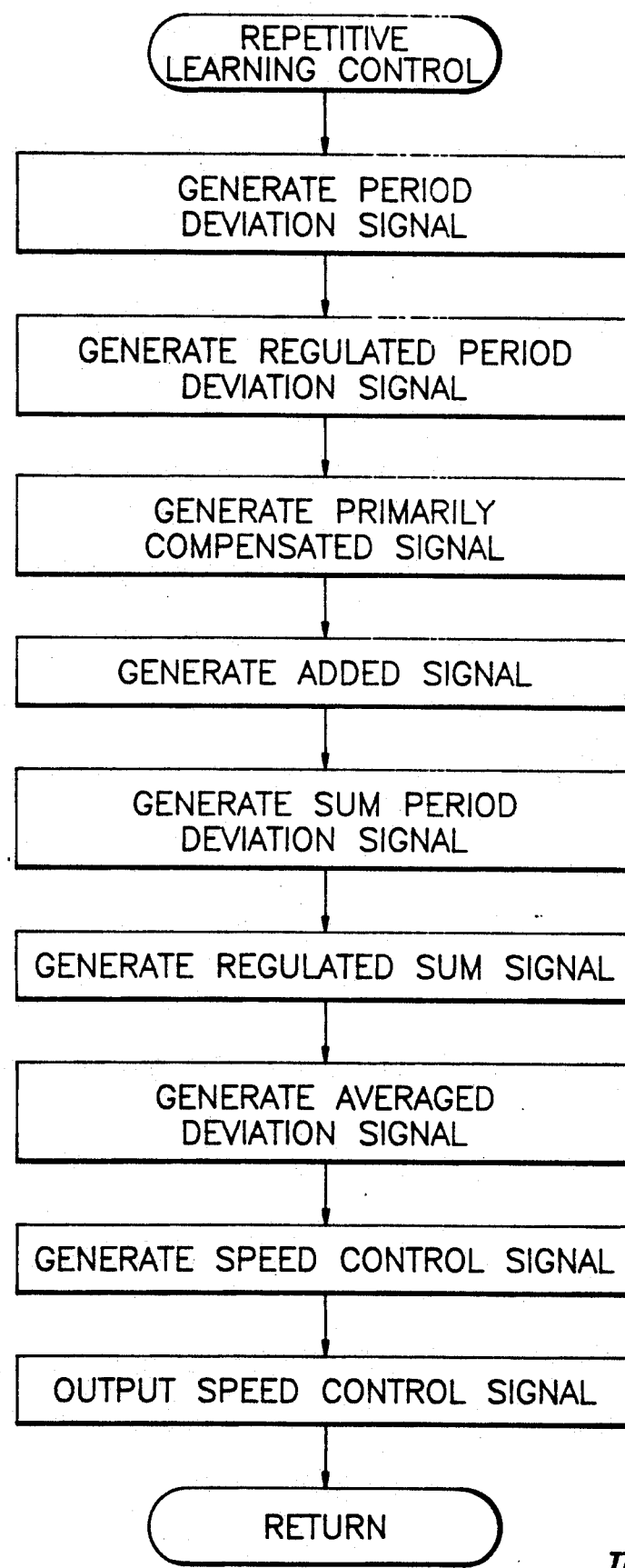
FIG. 5 is a flowchart which illustrates the operation of the repetitive learning circuit of FIG. 4.

Referring now to FIGS. 4 and 5, there are shown a detailed block diagram and a flow diagram of the repetitive learning circuit 34 of FIG. 2, respectively.

The speed error signal of the speed detection circuit 12 is supplied to a first (+) input terminal of a subtracter circuit 21. A characteristic regulating circuit 25 produces a regulated period deviation signal in response to a period deviation signal from a delay circuit 27 as will be further described hereinafter together with the characteristic regulating circuit 25. The regulated period deviation signal is supplied to a second (−) input terminal of the subtracter circuit 21.

The subtracter circuit 21 subtracts the speed error signal from the regulated deviation signal to produce a primarily compensated error signal. If the repetitive output of the subtracter circuit 21 becomes zero after the lapse of a certain period, it would mean that the period deviation between the periodic frequency signal and the predetermined reference speed signal is compensated. The primarily compensated error signal of the subtracter circuit 21 is supplied to the first input terminals of the first and the second adder circuits 23 and 31.

Applied to the second input terminal of the first adder circuit 23 is the output from the delay circuit 27. The first adder circuit 23 adds these two inputs supplied to the first and the second input terminals to produce an added signal as an input to the delay circuit 27.

The delay circuit 27 comprises 1 to N delay cells. Each of the delay cells latches the output signal from the first adder circuit 23 which enters through the right end of the delay circuit 27 and the latched signal in each of the delay cells is serially shifted by one signal to the left whenever the output from the adder circuit 23 is supplied to the delay circuit 27. As a result, the delay circuit 27 will have the period deviation signals of a cycle at every rotation of the motor. The output of the delay circuit 27 is provided to the subtracter circuit 21 as the period deviation signal, via the characteristic regulating circuit 25 as described above.

Consequently, the delay circuit 27 functions to cause the signal supplied to the second input terminal of the subtracter circuit 21 to periodically correspond to the signal supplied to the first input terminal thereof. More specifically, the frequency generator 4 generates N frequency signals per one rotation of the motor 2. The delay circuit 27 shifts the signal supplied from the adder circuit 23 by one signal at a time whenever each of the N frequency signals is processed through the speed detection circuit 12 and the subtracter circuit 21. Therefore, the output of the delay circuit 27 to be supplied to the second input terminal of the subtracter circuit 21 will have the relationship of periodically corresponding to the error signal to be applied to the first input terminal of the subtracter circuit 21. Thus, the number of the delay cells should be the same as that of the frequency signals.

The delayed output of the delay circuit 27 is also supplied to the characteristic regulating circuit 25. The characteristic regulating circuit 25 multiplies the delayed output by a predetermined value 1/K to produce the regulated period deviation signal, wherein K is a predetermined constant. A fast compensation for the period deviation may result in an unstable speed control of the motor, while a loose compensation for the period deviation is liable to maintain an incorrect speed control of the motor. That is, if the constant K is below or about 1, the compensation amount to be processed by the subtracter circuit 21 is increased; the speed control signal may be produced rapidly; but the compensation characteristic may be deteriorated. In contrast, if the constant K is above 1, the compensation amount to be processed by the subtracter circuit 21 is reduced; the time taken to compensate the period deviation may be longer; but the compensation characteristic may be improved. In accordance with the present invention, the constant K is preferably 4 to 10, and more preferably 8.

As described above, the regulated signal of the characteristic regulating circuit 25 is supplied to the second input terminal of the subtracter circuit 21. Accordingly, the subtracter circuit 21 is capable of repetitively compensating the periodic deviation between the periodic frequency signals.

Whenever each of the frequency signals is generated, the latched contents shifted from the first to the Nth delay cells in the delay circuit 27 are provided to the summation circuit 33. The summation circuit 33 adds these contents together to form a summed up signal. The summed up signal is multiplied by a predetermined value 1/K in a characteristic regulating circuit 35 which functions the same as the characteristic regulating circuit 25, wherein K is a constant which is equal to that of the characteristic regulating circuit 25.

The regulated signal in the characteristic regulating circuit 35 is divided by N in an averaging circuit 37 to produce an averaged signal. The number N corresponds to the number of the cells in the delay circuit 27. The averaged signal is supplied to a second input terminal of the adder circuit 31. The adder circuit 31 adds the output of the subtracter circuit 21 and the output of the averaging circuit 37. The output of the adder circuit 31 is applied to the PID controller 16 as the speed control signal, which is converted to an analog output, e.g., PWM (Pulse Width Modulation) signal by a conventional D/A converter (not shown) prior to its application to the amplifier 18.

The operation of the repetitive learning circuit 34 will be described with reference to FIGS. 6 and 7 as follows.

Figure 6:
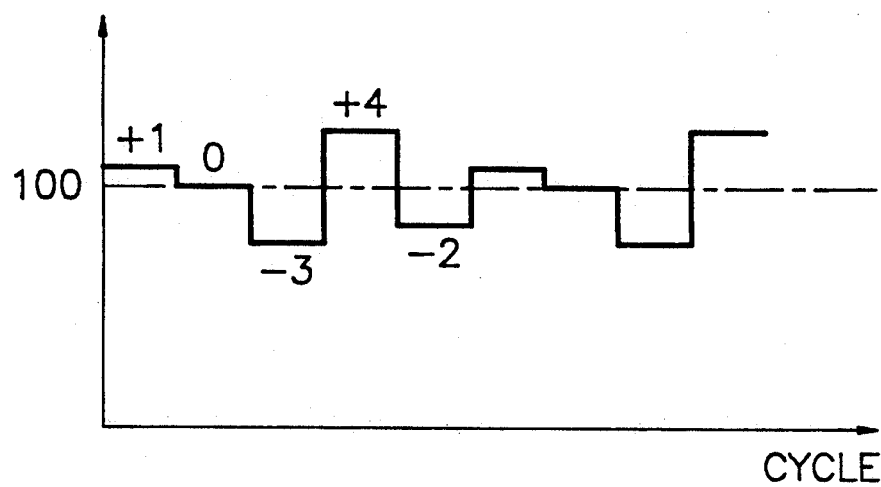
FIGS. 6 and 7 are illustrative graphs representing by way of example the period deviations, respectively.

FIG. 6 is an illustrative graph showing that where there are five frequency signals generated per one rotation of the motor, period deviations occur as +1, 0, −3, +4, −2, respectively, with respect to the predetermined reference frequency, e.g., 100, at the time when the motor is rotated with a constant speed. These period deviations are based on the rotational cycle of the motor, but the average for all of the deviations is constant in one rotational cycle.

Initially, the first period deviation +1 is periodically and repeatedly supplied to the first input terminal of the subtracter circuit 21. The output of the delay circuit 27 is supplied to the second input terminal of the subtracter circuit 21 through the characteristic regulating circuit 25. The output of the subtracter circuit 21 is supplied to the first input terminal of the adder circuit 31 and also is added to the output of the characteristic regulating circuit 25 by the adder circuit 23 whose output is fed back to the delay circuit 27. On the other hand, the contents of the delay cells are summed up by the summation circuit 33 whose output is supplied to the second input terminal of the adder circuit 31 through the characteristic regulating circuit 35 and the averaging circuit 37. This operation is repeated for some periods. Ultimately, the output of the subtracter circuit 21 will be zero. The output of the averaging circuit 37 will also be zero. Therefore, the adder circuit 31 will produce zero as the added output signal.

Accordingly, as a result of the repetitive learning control, the period deviation, i.e., +1 can be compensated because the repetitive learning circuit 34 will produce zero as a finally compensated period deviation signal.

Similarly, the repetitive learning control will also be applied to such deviations as 0, −3, +4, −2, which results in the same output as the first deviation +1.

Figure 7:
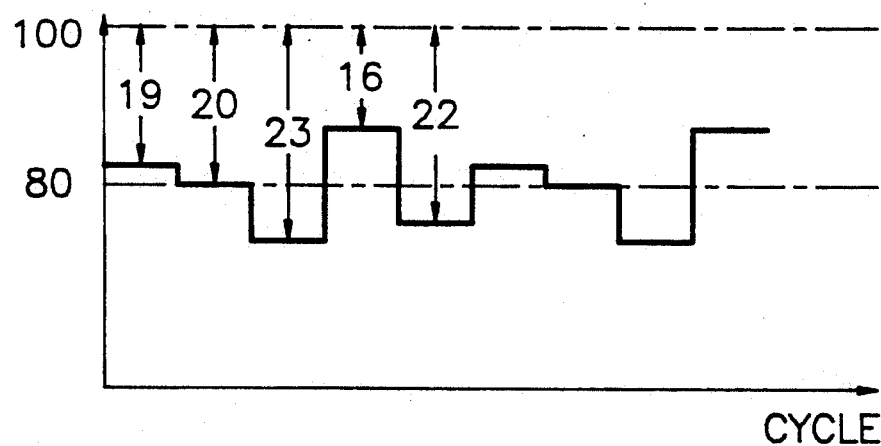

Referring now to FIG. 7, there is shown an illustrative graph that shows where there are five frequency signals generated per one rotation of the motor, the motor has the period deviations of +19, +20, +23, +16, +22, with respect to the predetermined reference frequency, at the time when the motor is rotated with a lower frequency, e.g., 80, caused by a certain factor. Initially, the first deviation +19 will be periodically supplied to the first input of the subtracter circuit 21. The output of the delay circuit 27 is supplied to the second input terminal of the subtracter circuit 21. Thereafter, the same operation as described with reference to FIG. 6 is repeated for some periods. Consequently, when the outputs of the subtracter circuit 21 and the averaging circuit 37 are provided to the adder circuit 31, the adder circuit 31 will have the input of zero on the first terminal and the input of +20 on the second terminal which is the average for the period deviations. The inputs to the first and the second input terminals of the adder circuit 31 are added. As a result, the adder circuit 31 produces the added signal +20 which is a finally compensated period deviation signal. Similarly, the repetitive learning control will be also applied to the deviations such as +20, +23, +16, +22, which results in the same output as the first deviation +19. Accordingly, it is possible to compensate the changed speed due to certain factors, which could not have been done in the prior art repetitive learning control system.

Figure 8:
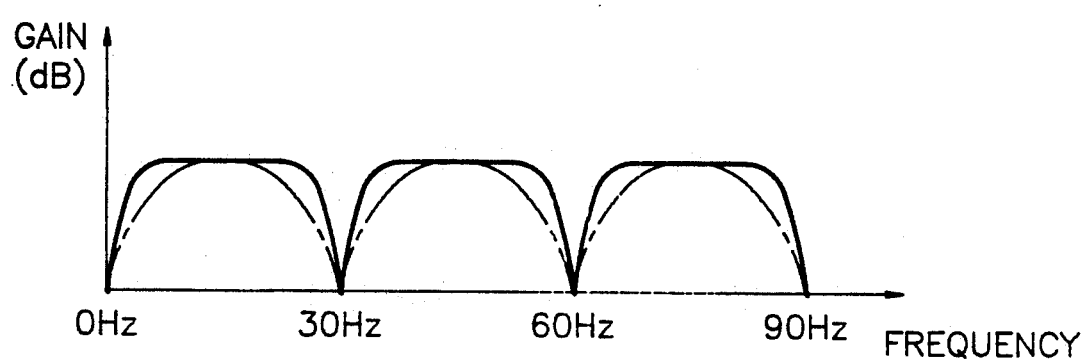
FIGS. 8 and 9 are characteristic curves of the periodic frequency signals which are processed by way of the prior art repetitive learning circuit and the present repetitive learning circuit.
Figure 9:
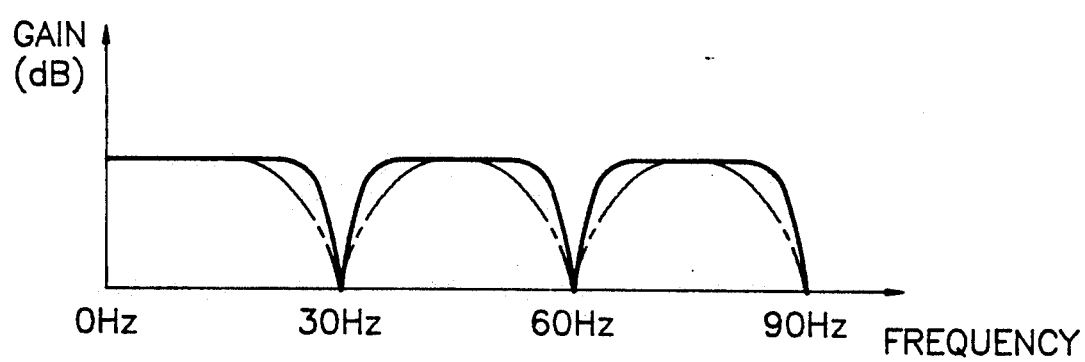

FIGS. 8 and 9 show characteristic curves of the periodic frequency signals which are processed by employing the prior art repetitive learning circuit and the present repetitive learning circuit, respectively. As can be seen FIG. 9, the external disturbance which constantally occurs near the 0 Hz band is compensated. This result is reflected the averaged deviation signal through the use of the summation circuit 33 and the averaging circuit 37. In both drawings, the solid lines indicate the compensation characteristic curve applying the K value of 8 in accordance with the present invention, while the dotted lines indicate the characteristic curve applying the K value of 4.

While the present invention has been shown and described with reference to a particular embodiment, it will be apparent to those skilled in the art that many changes and modifications may be made without departing from the spirit and scope of the invention as defined in the claims.

What is claimed is:

1. An apparatus for periodically detecting a speed error signal in response to a frequency signal periodically generated by a frequency generator in response to the rotation of a motor by a predetermined angle and repetitively compensating a period deviation between the frequency signal and a predetermined reference frequency signal to produce a motor speed control signal, the apparatus comprising:

a means for subtracting the speed error signal supplied to a first input terminal thereof from a period deviation signal supplied to a second input terminal thereof to produce a primarily compensated speed error signal;

a first means for adding the primarily compensated speed error signal supplied to the first input terminal thereof and the period deviation signal supplied to the second input terminal thereof to produce an added signal;

a means for delaying the output signal from the first adding means, wherein the delaying means comprises a first to an Nth delay cells, wherein each of the delay cells latches the output signal from the first adding means entering the first delay cell and serially shifts the latched signal in each of the delay cells toward the Nth delay cell by one signal at a time whenever the output of the first adding means is supplied to the delaying means and wherein the output from the delaying means is supplied to the second input terminal of the subtracter means and to the second input terminal of the first adding means;

a means for summing up all of the signals being shifted from the respective delay cells to produce a sum period deviation signal;

a means in response to the summing means for averaging the sum period deviation signal to produce an averaged period deviation signal; and a second means for adding the primarily compensated speed error signal from the subtracter means and the averaged period deviation signal from the averaging means to produce the motor speed control signal.

2. The apparatus of claim 1, further comprising a first characteristic regulating means for regulating the characteristic of the period deviation signal from the delaying means by multiplying the period deviation signal by 1/K and a second characteristic regulating means for regulating the characteristic of the sum period deviation signal from the summing means by multiplying the sum period deviation signal by 1/K, wherein K is an identical constant in the first and the second characteristic regulating means.

3. The apparatus of claim 1, wherein the averaging means divides the sum period deviation signal by the number of the delay cells, and wherein the number of the delay cells is the same as that of the frequency signals generated from the frequency generator per one rotation of the motor.

4. The apparatus of claim 1, further comprising a means in response to the speed error signal for determining whether the fluctuation range of the speed error signal from the predetermined reference frequency signal is within a predetermined range to selectively supply the speed error signal to the subtracter means.

5. The apparatus of claim 1, wherein said motor comprises a drum motor and a capstan motor used in a video cassette tape recorder.

6. A method for periodically detecting a speed error signal in response to a frequency signal periodically generated by a frequency generator in response to the rotation of a motor by a predetermined angle and repetitively compensating a period deviation between the frequency signal and a predetermined reference frequency signal to produce a motor speed control signal, the method comprising the steps of:

(a) subtracting the speed error signal from a period deviation signal to produce a primarily compensated speed error signal;

(b) adding the primarily compensated speed error signal and the period deviation signal to produce an added signal;

(c) delaying the added signal during one rotation cycle of the motor utilizing N delay cells connected in series such that a delayed added signal is produced at the output of each delay cell so as to produce the period deviation signal at the output of the Nth delay cell whenever the added signal is produced;

(d) summing each of the delayed added signals produced during the one rotation cycle of the motor to produce a sum period deviation signal;

(e) averaging the sum period deviation signal to produce an averaged signal; and (f) adding the primarily compensated speed error signal and the averaged signal to produce the motor speed control signal.

7. The method of claim 6, further comprising the step of regulating the characteristic of the period deviation signal by multiplying the period deviation signal by 1/K and the step of regulating the characteristic of the sum period deviation signal by multiplying the sum period deviation signal by 1/K, wherein K is an identical constant.

8. The method of claim 6, wherein the averaging step(e) divides the sum period deviation signal by the number of the frequency signals generated per one rotation of the motor and wherein the number of the frequency signals is the same as that of the added signals produced during the one rotation of the motor.

9. The method of claim 6, further comprising the step of determining whether the fluctuation range of the speed error signal from the predetermined reference signal is within a predetermined range to selectively perform the steps(a) to (f).

* * * * *